United States Patent
Roh et al.

(10) Patent No.: US 8,355,675 B2
(45) Date of Patent: Jan. 15, 2013

(54) APPARATUS AND METHOD FOR CONTROLLING FREQUENCY IN MOBILE COMMUNICATION SYSTEM

(75) Inventors: Hee-Jin Roh, Suwon-si (KR); Sang-Min Bae, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 475 days.

(21) Appl. No.: 12/365,509

(22) Filed: Feb. 4, 2009

(65) Prior Publication Data
US 2009/0197535 A1     Aug. 6, 2009

(30) Foreign Application Priority Data
Feb. 4, 2008   (KR) .................. 10-2008-0011166

(51) Int. Cl.
*H04B 1/00*   (2006.01)
(52) U.S. Cl. .................. 455/63.1; 455/63.3; 455/71
(58) Field of Classification Search ............... 455/63.1, 455/63.3, 71
See application file for complete search history.

(56) References Cited

U.S. PATENT DOCUMENTS

| | | | | |
|---|---|---|---|---|
| 5,241,700 A | * | 8/1993 | Geesen et al. | 455/260 |
| 5,432,521 A | * | 7/1995 | Siwiak et al. | 342/352 |
| 5,640,166 A | * | 6/1997 | Siwiak | 342/354 |
| 5,696,797 A | * | 12/1997 | Bucher et al. | 375/344 |
| 5,703,595 A | * | 12/1997 | Tayloe et al. | 342/175 |
| 6,473,594 B1 | * | 10/2002 | Piirainen | 455/63.1 |
| 6,614,860 B1 | * | 9/2003 | Piirainen | 375/341 |
| 6,834,076 B2 | * | 12/2004 | Xu | 375/211 |
| 7,299,013 B2 | * | 11/2007 | Rotta et al. | 455/67.16 |
| 7,558,576 B2 | * | 7/2009 | Chen et al. | 455/441 |
| 7,933,215 B2 | * | 4/2011 | Schiff et al. | 370/252 |

FOREIGN PATENT DOCUMENTS
KR     1020070084780     8/2007

* cited by examiner

*Primary Examiner* — Kenneth B. Wells
(74) *Attorney, Agent, or Firm* — The Farrell Law Firm, P.C.

(57) ABSTRACT

An apparatus and a method for mitigating interference between uplink signals of a user equipment in a mobile communication system are provided. The apparatus includes a frequency regulator for, when fast movement of a user equipment is confirmed, changing a transmit frequency by calculating a frequency offset compensation value which compensates for a frequency required for a transmit frequency band.

18 Claims, 9 Drawing Sheets

APPARATUS AND METHOD FOR CONTROLLING FREQUENCY IN MOBILE COMMUNICATION SYSTEM

PRIORITY

This application claims priority under 35 U.S.C. §119(a) to a Korean patent application filed in the Korean Intellectual Property Office on Feb. 04, 2008 and assigned Serial No. 10-2008-0011166, the entire disclosure of which is incorporated herein by reference.

BACKGROUND OF THE INVENTION

1. Field of the Invention

The present invention relates generally to an apparatus and a method for controlling an uplink frequency in a mobile communication system. More particularly, the present invention relates to an apparatus and a method for controlling a frequency to mitigate interference between uplink signals of a user equipment in a $3^{rd}$ Generation Partnership Project (3GPP) Long Term Evolution (LTE) mobile communication system.

2. Description of the Related Art

Multimedia systems of the future need to meet demands for fast transmission of high-capacity data, and an increasing demand for wireless communication. Recently, research has been conducted relating to a transmission scheme that allows for high-speed data transmission with high frequency utilization. To transmit high-speed data of a short symbol period, a wide transmission band is required and a frequency selective fading, caused by Inter-Symbol Interference (ISI) or multi-path interference of a radio channel, should be overcome. Multi-carrier techniques transmit data using multiple carriers by extending the symbol period. An Orthogonal Frequency Division Multiplexing (OFDM) scheme, which is one of the multi-carrier techniques, features high frequency utilization by overlapping orthogonal frequency bands of the subcarriers, and fast modulation and demodulation using the multiple carriers through Inverse Fast Fourier Transform (IFFT) and Fast Fourier Transform (FFT). The OFDM scheme can achieve the simple equalization with one tap per subcarrier in the frequency domain by sustaining the orthogonality of the subcarriers using a guard interval longer than a delay spread of the signal of the multi-path channel.

An Orthogonal Frequency Division Multiple Access (OFDMA) transmission scheme sends data using multiple carriers. The multi-carrier maintains a minimum frequency spacing (subcarrier spacing) and thus utilizes the entire frequency band with efficiency.

However, the OFDMA transmission scheme, which is very sensitive to a frequency offset, suffers from Inter-Carrier Interference (ICI) caused by some frequency offset.

To mitigate the interference of the frequency offset, a general mobile communication system adopts a frequency control method using an oscillator and a frequency control method using a numerically controlled oscillator.

FIG. 1 depicts the frequency control method of a static channel in the general mobile communication system.

When a base station transmits a DownLink (DL) signal using a Radio Frequency (RF) center frequency of $f_{RF\_BS\_DL}$ in FIG. 1, the spectrum is generated as shown in (a).

Next, provided that a frequency offset $\Delta f_{Rx\_UE}$ is generated in consideration of an oscillator variation between the user equipment and the base station while an antenna of the user equipment receives a receive signal in (b), the user equipment receives the receive signal over the RF center frequency $f_{RF\_UE\_DL}$ as shown in (c). When the user equipment compensates for the frequency offset using an Automatic Frequency Controller (AFC), the signal is received with the transmit and receive frequencies matched as shown in (d).

Meanwhile, UpLink (UL) data of the user equipment is transmitted using a transmit frequency $f_{RF\_UE\_DL}$ of the frequency spacing $f_{RF\_UE\_DL}-f_{RF\_UE\_UL}$ as shown in (e). The base station can receive the signal compensated by the AFC of the user equipment as shown in (f) and (g).

FIG. 2 depicts the frequency control method of a mobile channel in the general mobile communication system.

When the base station transmits a DL signal using the RF center frequency $f_{RF\_BS\_DL}$ in FIG. 2, the spectrum is generated as shown in (a). Doppler frequency offset generated when the user equipment moves around causes the reception spectrum as shown in (b).

Accordingly, the difference between the RF receive frequency and the RF transmit frequency of the user equipment produces the frequency offset $\Delta f_{doppler\_DL}+\Delta f_{osc}$ which combines the Doppler frequency offset and the offset of the transmit and receive frequencies as shown in (c).

Next, when the AFC of the user equipment compensates the frequency offset, the user equipment receives the receive signal of (d).

Meanwhile, the data transmission from the user equipment to the base station uses a transmit frequency $f_{RF\_UE\_UL}$ with the frequency spacing $f_{RF\_UE\_DL}-f_{RF\_UE\_UL}$ as shown in (e). The signal received at the base station suffers the Doppler frequency $\Delta f_{doppler\_DL}$ as shown in (f).

When the user equipment and the base station use the multi-path channel under the same condition, the Doppler frequency of the base station faces the same direction as the Doppler frequency of the user equipment as shown in (f).

This problem arises when the user equipment moves at a low speed, rather than at a high speed. Hence, a receiver of the base station is subject to the additional frequency offset.

FIG. 3 depicts the signal received at the base station in the general mobile communication system.

When a plurality of user equipments accesses the base station at the same time, the user equipments suffer from the Doppler frequency according to their different channel environments. The signals of the fast moving user equipments and the signals of the slow moving user equipments of FIG. 3 cause the ICI in the uplink of the multi-access scheme, such as OFDMA, and thus degrade the reception performance.

SUMMARY OF THE INVENTION

The present invention has been made to address at least the above problems and/or disadvantages and to provide at least the advantages described below. Accordingly, an aspect of the present invention provides an apparatus and a method for mitigating interference of uplink signals in a mobile communication system.

Another aspect of the present invention provides an apparatus and a method for controlling a frequency according to a velocity of a user equipment in a mobile communication system.

An additional aspect of the present invention provides an apparatus and a method for predicting a frequency compensation value according to a velocity of a user equipment in a mobile communication system.

According to one aspect of the present invention, an apparatus for controlling a frequency in a mobile communication system is provided. The apparatus includes a frequency regulator for, when fast movement of a user equipment is confirmed, changing a transmit frequency by calculating a frequency offset compensation value which compensates for a frequency required for a transmit frequency band.

According to another aspect of the present invention, a method for controlling a frequency in a mobile communication system is provided. A velocity of a user equipment is determined. When confirming fast movement of the user equipment, a frequency offset compensation value is calculated which compensates for a frequency required for a transmit frequency band. A transmit frequency is changed using the calculated frequency offset compensation value.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF PREFERRED EMBODIMENTS

Figure 1:
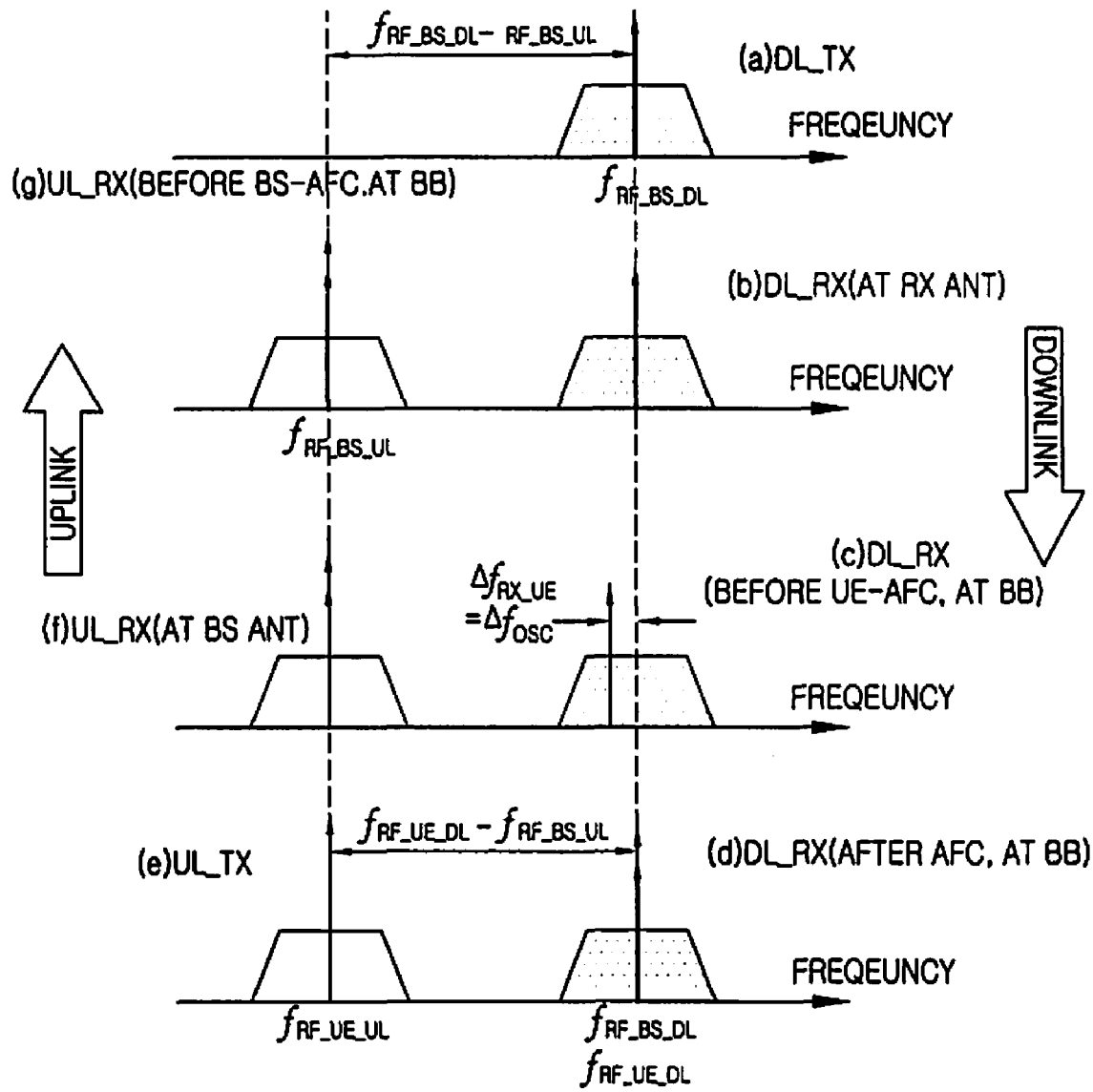
FIG. 1 is a diagram illustrating a frequency control method of a static channel in a general mobile communication system.
Figure 2:
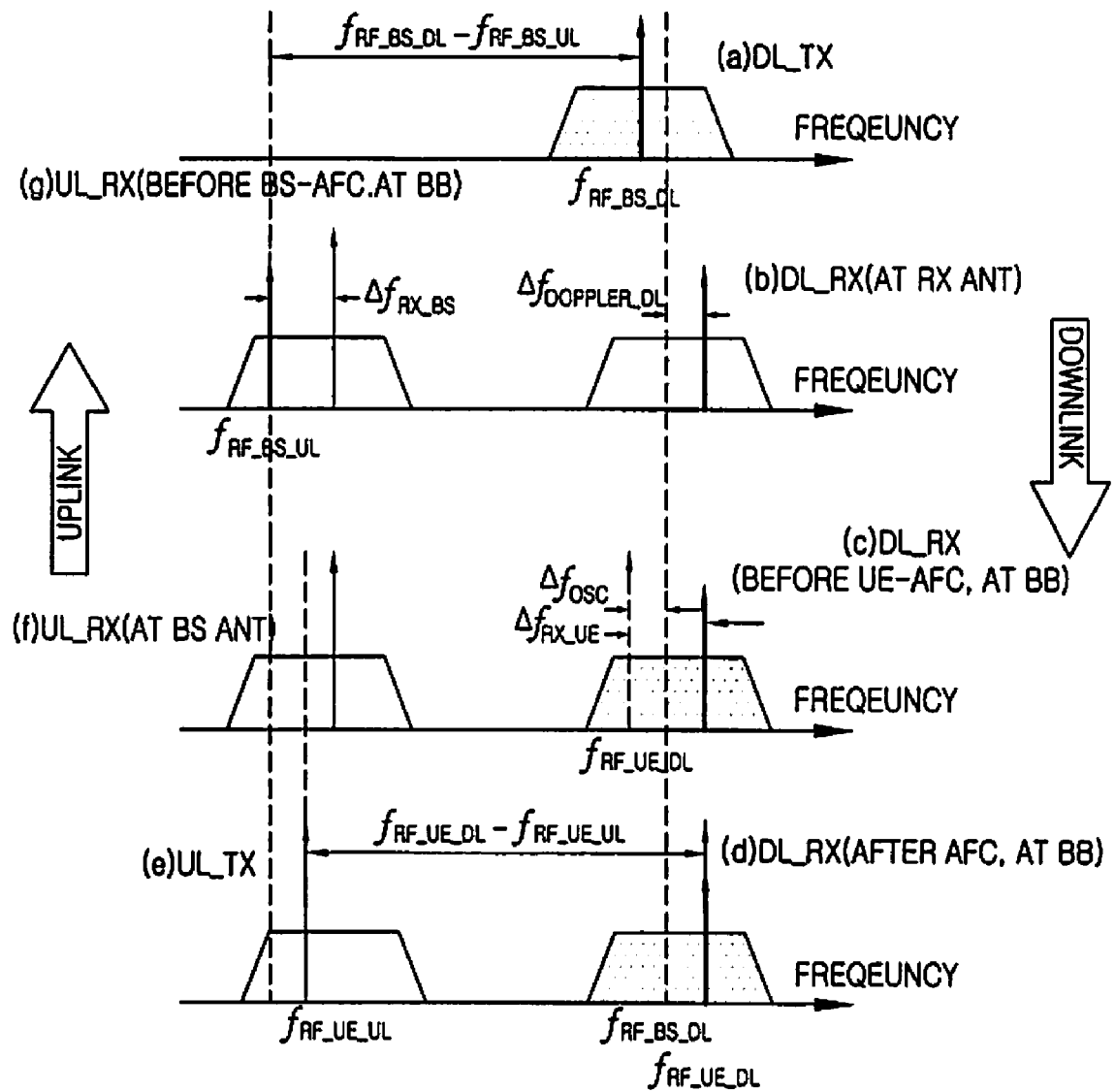
FIG. 2 is a diagram illustrating a frequency control method of a mobile channel in the general mobile communication system.
Figure 3:
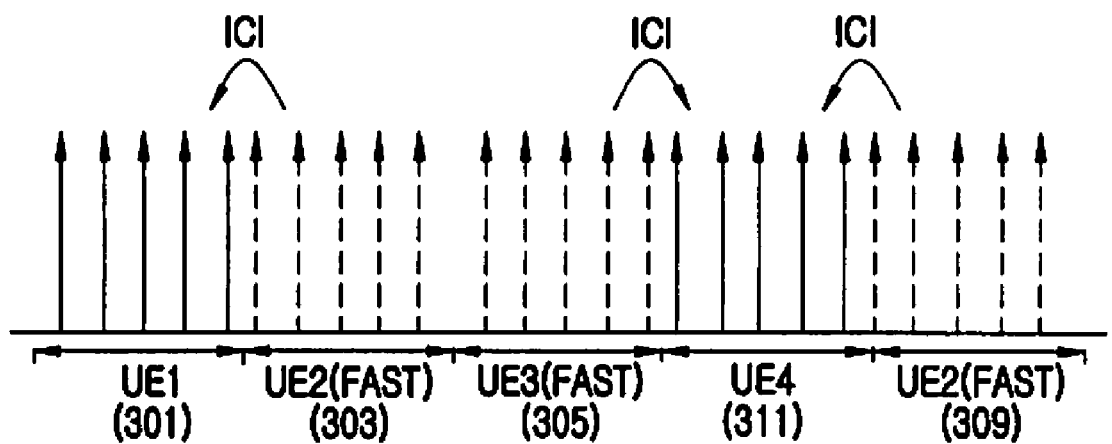
FIG. 3 is a diagram illustrating a signal received at a base station in the general mobile communication system.

Preferred embodiments of the present invention are described in detail with reference to the accompanying drawings. It should be noted that the same or similar components are designated by the same or similar reference numerals although they are illustrated in different drawings. Detailed descriptions of constructions or processes known in the art may be omitted to avoid obscuring the subject matter of the present invention.

The embodiments of the present invention provide an apparatus and a method for controlling a frequency to mitigate interference between uplink signals of a user equipment in a $3^{rd}$ Generation Partnership Project (3GPP) Long Term Evolution (LTE) mobile communication system.

Figure 4:
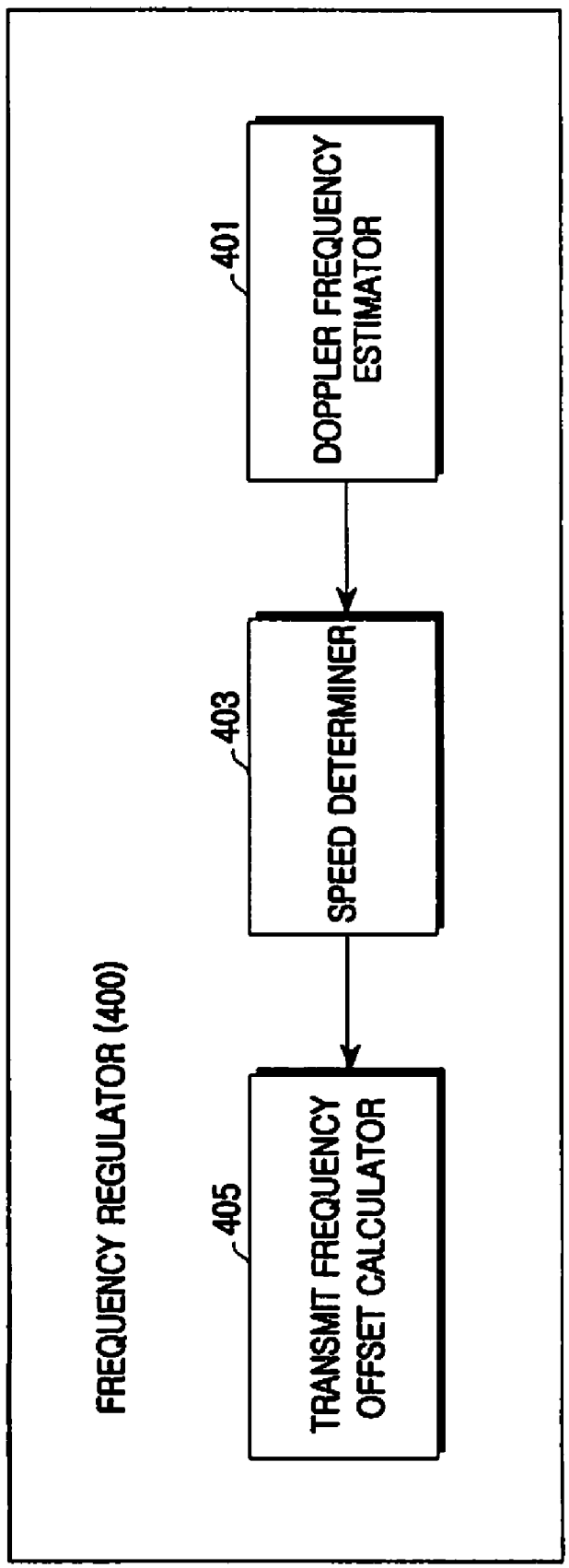
FIG. 4 is a diagram illustrating a frequency regulator according to an embodiment of the present invention.

FIG. 4 is a block diagram of a frequency regulator according to an embodiment of the present invention.

A frequency regulator 400 of FIG. 4 can include a Doppler frequency estimator 401, a speed determiner 403, and a transmit frequency offset calculator 405.

When a user equipment is moving fast, the frequency regulator 400 predicts the possible Doppler frequency in the uplink signal transmission by estimating a difference between transmit and receive frequencies in relation to a base station and the Doppler frequency received in the downlink. The frequency regulator 400 then processes to compensate for the frequency of the transmit signal. Thus, the frequency regulator 400 processes to reduce interference signals that can be generated when the uplink signal is demodulated.

The Doppler frequency estimator 401 of the frequency regulator 400 measures the Doppler frequency from the input data and provides the measured Doppler frequency value to the speed determiner 403. Namely, the Doppler frequency estimator 401 estimates the Doppler frequency to determine the velocity of the user equipment.

The speed determiner 403 checks the velocity of the user equipment using the Doppler frequency provided from the Doppler frequency estimator 401 and determines whether the user equipment is moving at the high speed or at the low speed. Herein, when receiving a Doppler frequency value that is lower than a threshold ($\Delta f_{doppler\_DL}$<threshold1) from the Doppler frequency estimator 401, the speed determiner 403 can determine the slow movement of the user equipment. When receiving a Doppler frequency value that is greater than a threshold ($\Delta f_{doppler\_DL}$>threshold2), the speed determiner 403 can determine the fast movement of the user equipment. The speed determiner 403 can define the threshold for determining the low speed and the threshold for determining the high speed as different values (threshold1≠threshold2) or as the same value (threshold1=threshold2).

The transmit frequency offset calculator 405 calculates a frequency offset compensation value to compensate for the frequency required for the transmit frequency band. Herein, the transmit frequency offset calculator 405 can operate according to a frequency control scheme using an oscillator, and can operate according to a frequency control scheme using a numerically controlled oscillator, which will be described in detail below with reference to FIGS. 6 and 7.

The descriptions have explained the frequency control apparatus for mitigating the interference between the UL signals of the user equipment in the 3GPP LTE mobile communication system. Hereafter, the frequency control method is described for mitigating the interference between the UL signals of the user equipment by use of the above-mentioned apparatus in the 3GPP LTE mobile communication system.

Figure 5:
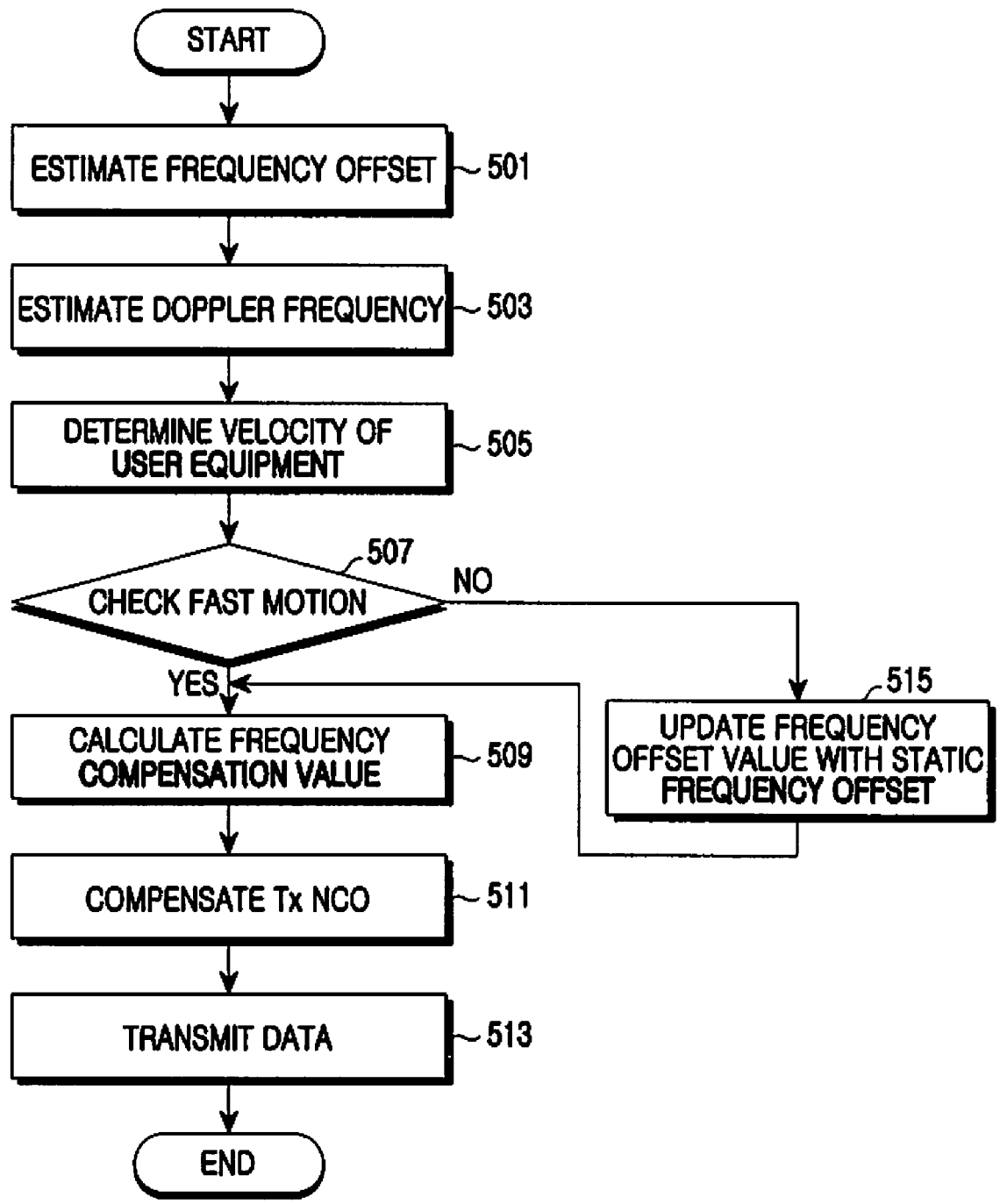
FIG. 5 is a flow diagram illustrating a method for controlling an uplink frequency at a user equipment according to an embodiment of the present invention.

FIG. 5 is a flowchart outlining a method for controlling the UL frequency at the user equipment according to an embodiment of the present invention. The UL frequency controlling method is applicable to both the frequency control using the oscillator and the frequency control using the numerically controlled oscillator.

The user equipment estimates the frequency offset value from the DL receive signal in step 501 and estimates the Doppler frequency value according to the movement of the user equipment in step 503. Herein, the user equipment can acquire the frequency offset value using the oscillator difference between the transmitter and the receiver.

In step 505, the user equipment determines its velocity using the Doppler frequency value estimated in step 503. In step 507, the user equipment checks whether it is moving fast or not. Determining of the velocity of the user equipment examines whether the user equipment is moving at the high speed or at the low speed. When estimating a Doppler frequency value below a preset threshold, the user equipment determines slow movement of the user equipment. When estimating a Doppler frequency value above a threshold, the user equipment determines fast movement of the user equipment.

When slow movement is determined in step 507, the user equipment updates the frequency offset value estimated in step 501 with the static frequency offset value $\Delta f_{static}$ in step

515. Due to the small Doppler frequency offset value of the slow-moving user equipment, the updated static frequency offset value is used to reflect the frequency offset value of the transmitter and the receiver.

By contrast, when the fast movement of the user equipment is determined in step 507, the user equipment calculates the frequency offset compensation value to make up for the frequencies required for the transmit frequency band in step 509. Herein, the frequency offset compensation value adopts the compensation value which predicts the possible Doppler frequency in the transmit signal delivery. The user equipment can operate depending on the frequency control using the oscillator and the frequency control using the numerically controlled oscillator.

The user equipment processes to change the transmit frequency using the calculated frequency offset compensation value in step 511 and performs the actual data transmission in step 513.

The user equipment then finishes this process.

Figure 6:
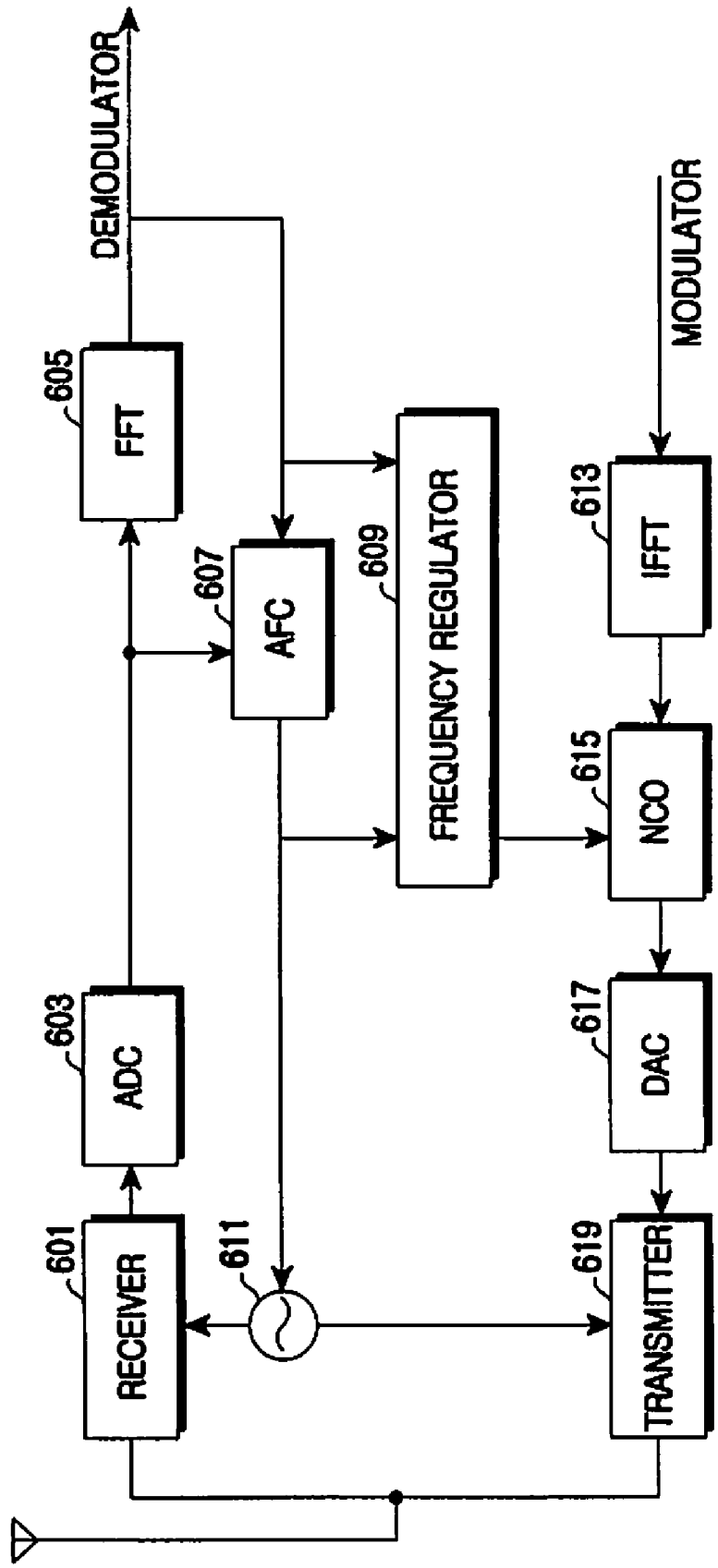
FIG. 6 is a diagram illustrating a user equipment including a frequency regulator according to an embodiment of the present invention.

FIG. 6 is a block diagram of a user equipment including a frequency regulator according to an embodiment of the present invention. The user equipment is assumed to employ the frequency control using the oscillator.

The user equipment of FIG. 6 includes a receiving apparatus and a transmitting apparatus. The receiving apparatus includes a receiver 601, an Analog/Digital Converter (ADC) 603, an FFT processor 605, an AFC 607, and a frequency regulator 609. The transmitting apparatus includes a transmitter 619, a Digital/Analog Converter (DAC) 617, a Numerically Controlled Oscillator (NCO) 615, and an IFFT processor 613. An oscillator 611 may lie between the receiving apparatus and the transmitting apparatus.

The signal transmitted from the base station includes noise in the multipath channel and is received via an antenna of the user equipment. The signal received over the antenna is down-converted into an Intermediate Frequency (IF) band through an RF processor of the receiver 601. The ADC 603 converts the analog signal to a digital signal. The FFT processor 605 applies the FFT on the received signal.

The AFC 607 estimates the difference between the frequencies of the different bands, controls the oscillator to guarantee the reception performance of the user equipment, and thus conducts the AFC function.

When fast movement of the user equipment is determined, the frequency regulator 609 estimates the difference between the transmit and receive frequencies in relation to the base station and the Doppler frequency of the signal received from the base station. Thus, the frequency regulator 609 predicts the possible Doppler frequency of the signal transmitted to the base station and processes to compensate for the UL signal frequency using the predicted frequency.

Using the frequency control by means of the oscillator, the frequency regulator 609 of the user equipment can control the frequency of the UL signal as set forth below.

As described in FIG. 5, the frequency regulator 609 determines the velocity of the user equipment by estimating the Doppler frequency.

When slow movement of the user equipment is determined, the frequency regulator 609 updates the estimated frequency offset value with the static frequency offset $\Delta f_{static}$. When fast movement of the user equipment is determined, the frequency regulator 609 calculates the frequency offset compensation value to compensate for the frequency required for the transmit frequency band based in Equation (1). More specifically, to control the oscillator based on the frequency offset estimated from the DL signal, the frequency regulator 609 can compensate for the DL signal of the fast-moving user equipment and control the NCO to compensate for the UL signal which is not compensated $$\begin{aligned}
\Delta f_{TX\_UE} &= -\Delta f_{Doppler\_DL} - \Delta f_{Doppler\_UL} \quad (1)\\
&= -\Delta f_{Doppler\_DL} - \frac{f_{RF\_UE\_UL}}{f_{RF\_UE\_DL}} \cdot \Delta f_{Doppler\_DL}\\
&= -\left(1 + \frac{f_{RF\_UE\_UL}}{f_{RF\_UE\_DL}}\right) \cdot \Delta f_{Doppler\_DL}\\
&= -\left(1 + \frac{f_{RF\_UE\_UL}}{f_{RF\_UE\_DL}}\right) \cdot (\Delta f_{RX\_UE} - \Delta f_{static})
\end{aligned}$$

In Equation (1), $\Delta f_{TX\_UE}$ denotes the frequency offset compensation value to compensate for the frequencies required for the transmit frequency band, $\Delta f_{Doppler\_DL}$ denotes the DL Doppler frequency, $\Delta f_{Doppler\_UL}$ denotes the UL Doppler frequency, $\Delta f_{RX\_UE}$ denotes the frequency offset value estimated from the DL of the user equipment, $\Delta f_{static}$ denotes the static frequency offset value, $f_{RF\_UE\_UL}$ denotes the UL radio frequency, and $f_{RF\_UE\_DL}$ denotes the DL radio frequency.

The frequency regulator 609 can calculate the frequency offset compensation value based on Equation (2). Equation (2) is used when the transmit and receive frequency spacing is small enough for the RF frequency value and is simplified from Equation (1).

$$\begin{aligned}
\Delta f_{TX\_UE} &\approx -2 \cdot \Delta f_{Doppler\_DL} \text{ when } f_{RF\_UE\_DL} \approx f_{RF\_UE\_UL} \quad (2)\\
&= -2 \cdot (\Delta f_{RX\_UE} - \Delta f_{static})
\end{aligned}$$

In Equation (2), $\Delta f_{TX\_UE}$ denotes the frequency offset compensation value to compensate for the frequencies required for the transmit frequency band, $\Delta f_{Doppler\_DL}$ denotes the DL Doppler frequency, $\Delta f_{static}$ denotes the static frequency offset value, and $\Delta f_{RX\_UE}$ denotes the frequency offset value estimated from the DL of the user equipment.

The NCO 615 compensates for the UL signal using the frequency offset compensation value calculated at the frequency regulator 609 and provides the compensated UL signal to the DAC 617. The DAC 617 converts the fed digital signal to an analog signal and transmits the analog signal to the base station through the transmitter 619.

Figure 7:
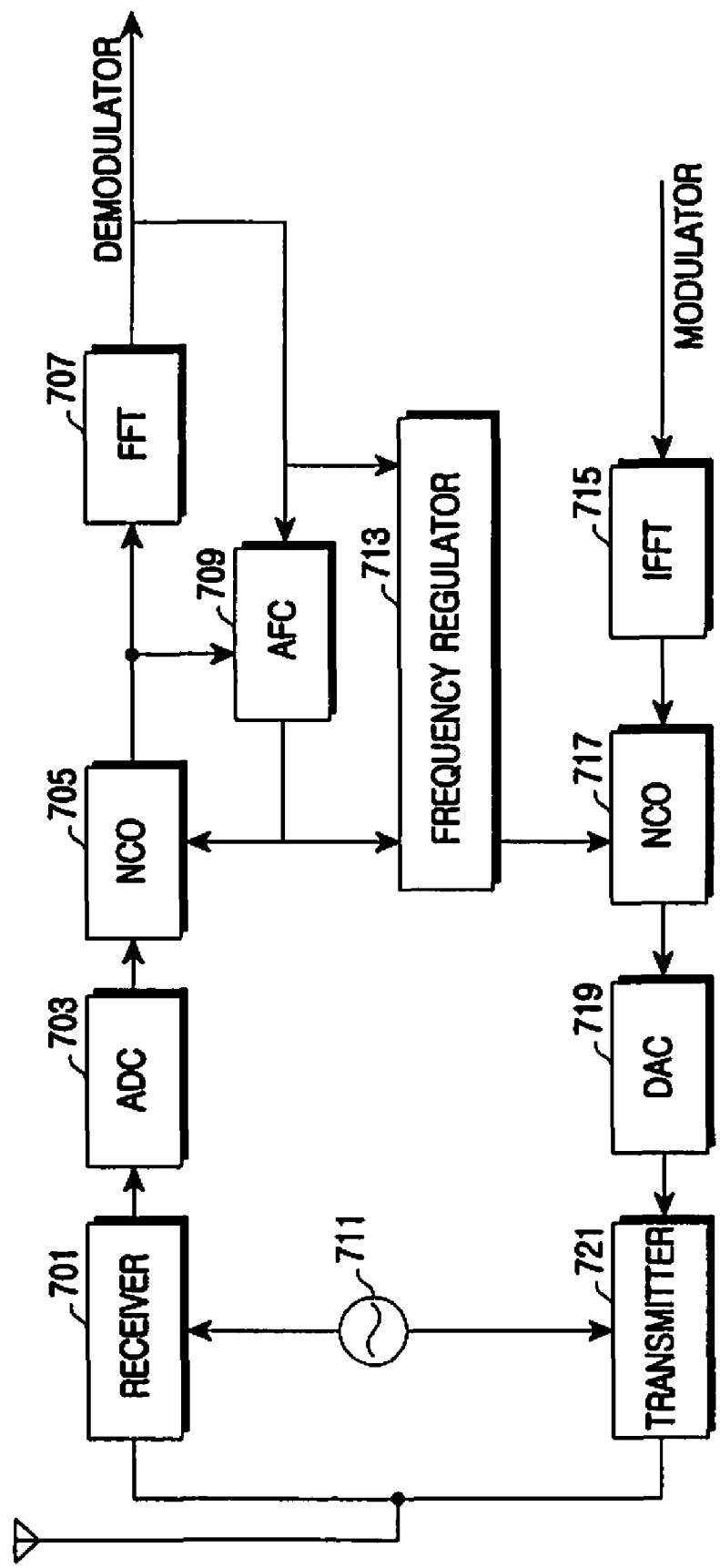
FIG. 7 is a diagram illustrating a user equipment including a frequency regulator according to another embodiment of the present invention.

FIG. 7 is a block diagram of a user equipment including a frequency regulator according to another embodiment of the present invention. The user equipment is assumed to employ the frequency control using the NCO.

The user equipment of FIG. 7 includes a receiving apparatus and a transmitting apparatus. The receiving apparatus includes a receiver 701, an ADC 703, a receiver NCO 705, an FFT processor 707, an AFC 709, and a frequency regulator 713. The transmitting apparatus includes a transmitter 721, a DAC 719, a transmitter NCO 717, and an IFFT processor 715. An oscillator 711 may lie in between the receiving apparatus and the transmitting apparatus.

The signal transmitted from the base station includes noise in the multipath channel and is received via an antenna of the user equipment. The signal received over the antenna is down-converted into the IF band through an RF processor of the receiver 701. The ADC 703 converts the analog signal to a digital signal and outputs the digital signal to the receiver NCO 705. The receiver NCO 705 compensates for the frequency offset caused by the automatic frequency control and controls the FFT processor 707 to perform the FFT on the received signal.

The AFC 709 estimates the difference of the frequencies of the different bands and conducts the AFC function to guarantee the reception performance of the user equipment.

When fast movement of the user equipment is determined, the frequency regulator 713 estimates the difference between the transmit and receive frequencies in relation to the base station and the Doppler frequency of the signal received from the base station. Thus, the frequency regulator 713 predicts the possible Doppler frequency of the signal transmitted to the base station and processes to compensate for the UL signal frequency using the predicted frequency.

Using the frequency control by means of the NCO 705, the frequency regulator 713 of the user equipment can control the UL signal frequency as set forth below.

The frequency regulator 713 determines the velocity of the user equipment by estimating the Doppler frequency as shown in FIG. 5.

When slow movement of the user equipment is determined, the frequency regulator 713 updates the estimated frequency offset value with the static frequency offset $\Delta f_{stsatic}$. When fast movement of the user equipment is determined, the frequency regulator 713 calculates the frequency offset compensation value to compensate for the frequencies required for the transmit frequency band based on Equation (3). More specifically, the frequency regulator 713 controls the uplink frequency using the frequency offset estimated from the DL signal and the frequency required by the transmitter NCO 717 for the frequency band.

$$\Delta f_{TX\_UE} = \frac{f_{RF\_UE\_UL}}{f_{RF\_UE\_DL}} \cdot \Delta f_{RX\_UE} - \Delta f_{Doppler\_DL} - \Delta f_{Doppler\_UL} \quad (3)$$

$$= \frac{f_{RF\_UE\_UL}}{f_{RF\_UE\_DL}} \cdot \Delta f_{RX\_UE} - \Delta f_{Doppler\_DL} -$$

$$\frac{f_{RF\_UE\_UL}}{f_{RF\_UE\_DL}} \cdot \Delta f_{Doppler\_DL}$$

$$= \frac{f_{RF\_UE\_UL}}{f_{RF\_UE\_DL}} \cdot \Delta f_{RX\_UE} - \left(1 + \frac{f_{RF\_UE\_UL}}{f_{RF\_UE\_DL}}\right) \cdot \Delta f_{Doppler\_DL}$$

$$= \frac{f_{RF\_UE\_UL}}{f_{RF\_UE\_DL}} \cdot \Delta f_{RX\_UE} - \left(1 + \frac{f_{RF\_UE\_UL}}{f_{RF\_UE\_DL}}\right) \cdot (\Delta f_{RX\_UE} - \Delta f_{static})$$

In Equation (3), $\Delta f_{TX\_UE}$ denotes the frequency offset compensation value to compensate for the frequencies required for the transmit frequency band, $\Delta f_{Doppler\_DL}$ denotes the DL Doppler frequency, $\Delta f_{Doppler\_UL}$ denotes the UL Doppler frequency, $\Delta f_{RX\_UE}$ denotes the frequency offset value estimated from the DL of the user equipment, $\Delta f_{static}$ denotes the static frequency offset value, $f_{RF\_UE\_UL}$ denotes the UL radio frequency, and $f_{RF\_UE\_DL}$ denotes the DL radio frequency.

The frequency regulator can calculate the frequency offset compensation value based on Equation (4). Equation (4) is used when the transmit and receive frequency spacing is small enough for the RF frequency value and is simplified from Equation (3).

$$\Delta f_{TX\_UE} \approx \Delta f_{RX\_UE} - 2 \cdot \Delta f_{Doppler\_DL} \text{ when } f_{RF\_UE\_DL} \approx f_{RF\_UE\_UL} \quad (4)$$

$$= -\Delta f_{RX\_UE} + 2\Delta f_{static}$$

In Equation (4), $\Delta f_{TX\_UE}$ denotes the frequency offset compensation value to compensate for the frequencies required for the transmit frequency band, $\Delta f_{Doppler\_DL}$ denotes the DL Doppler frequency, $\Delta f_{static}$ denotes the static frequency offset value, and $\Delta f_{RX\_UE}$ denotes the frequency offset value estimated from the DL of the user equipment.

The NCO 717 compensates for the UL signal using the frequency offset compensation value calculated by the frequency regulator 713 and provides the compensated UL signal to the DAC 719. The DAC 719 converts the received digital signal to an analog signal and transmits the analog signal to the base station through the transmitter 721.

Figure 8:
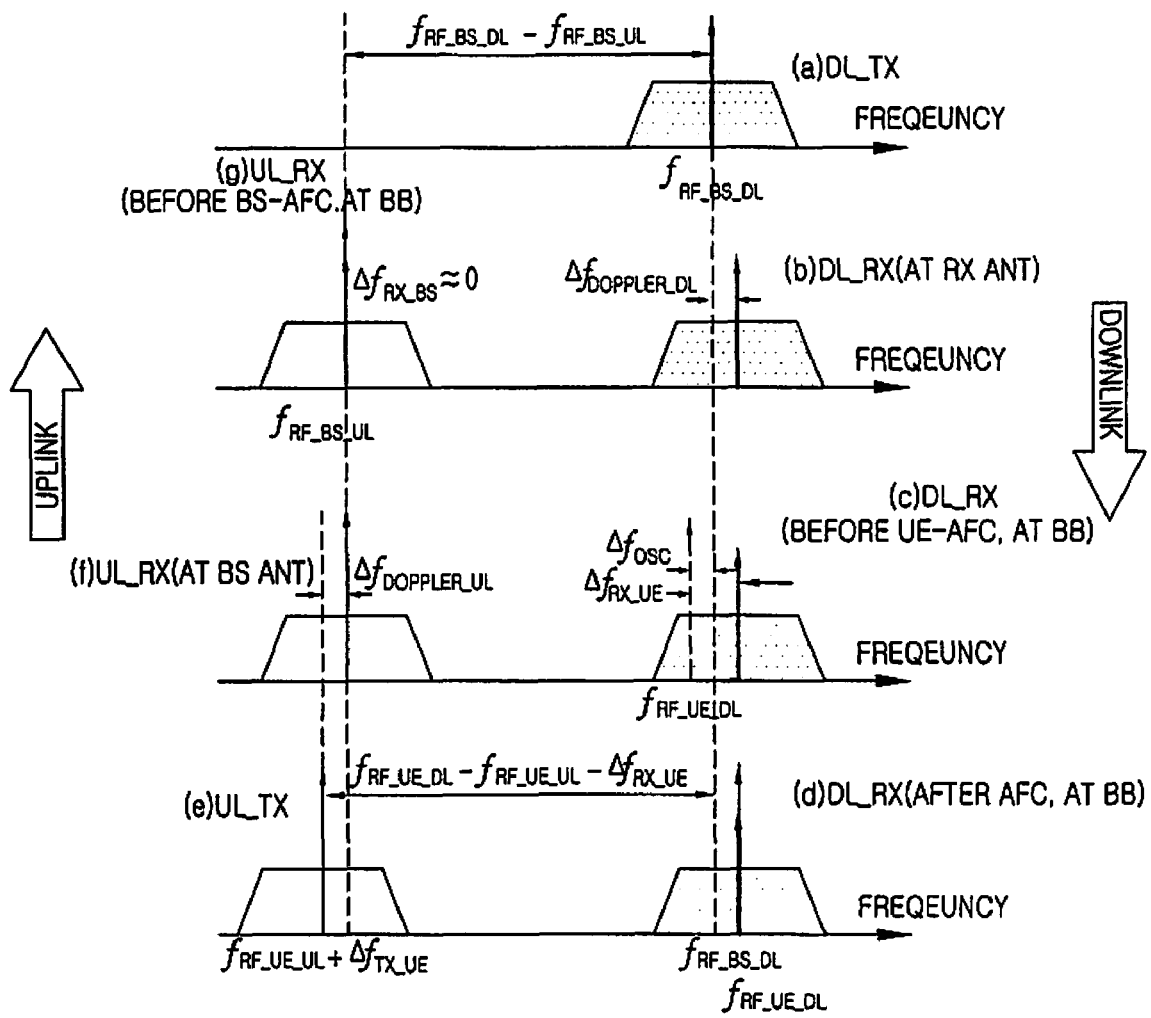
FIG. 8 is a flow diagram illustrating a frequency control method of the user equipment according to an exemplary of the present invention.

FIG. 8 depicts the frequency control method of the user equipment according to an embodiment of the present invention.

When the base station transmits a DL signal using the RF center frequency $f_{RF\_BS\_DL}$ in FIG. 8, the spectrum is generated as shown in (a). Since the Doppler frequency offset $\Delta f_{doppler\_DL}$ is generated, the user equipment acquires the receive spectrum as shown in (b). Because of the difference $\Delta f_{osc}$ between the receive frequency of the user equipment and the transmit frequency of the base station, the amount of the frequency offset actually generated at the user equipment is equal to $\Delta f_{doppler\_DL} + \Delta f_{osc}$ which combines the Doppler frequency offset and the transmit and receive frequency offset as shown in (c).

Next, the AFC of the user equipment compensates the frequency offset and processes to match and receive the carriers as shown in (d). When the user equipment is moving at the high speed, the UL signal is transmitted over the RF center frequency corresponding to $f_{RF\_UE\_UL} + \Delta f_{TX\_UE}$ as shown in (e).

Hence, the signal received at the base station suffers from the Doppler frequency $\Delta f_{doppler\_UL}$ in (f). As a result, the RF frequency of the UL signal received at the base station matches the RF frequency used by the base station as shown in (g). That is, the UL reception is carried out with the Doppler frequency compensated according to the motion of the user equipment.

Figure 9:
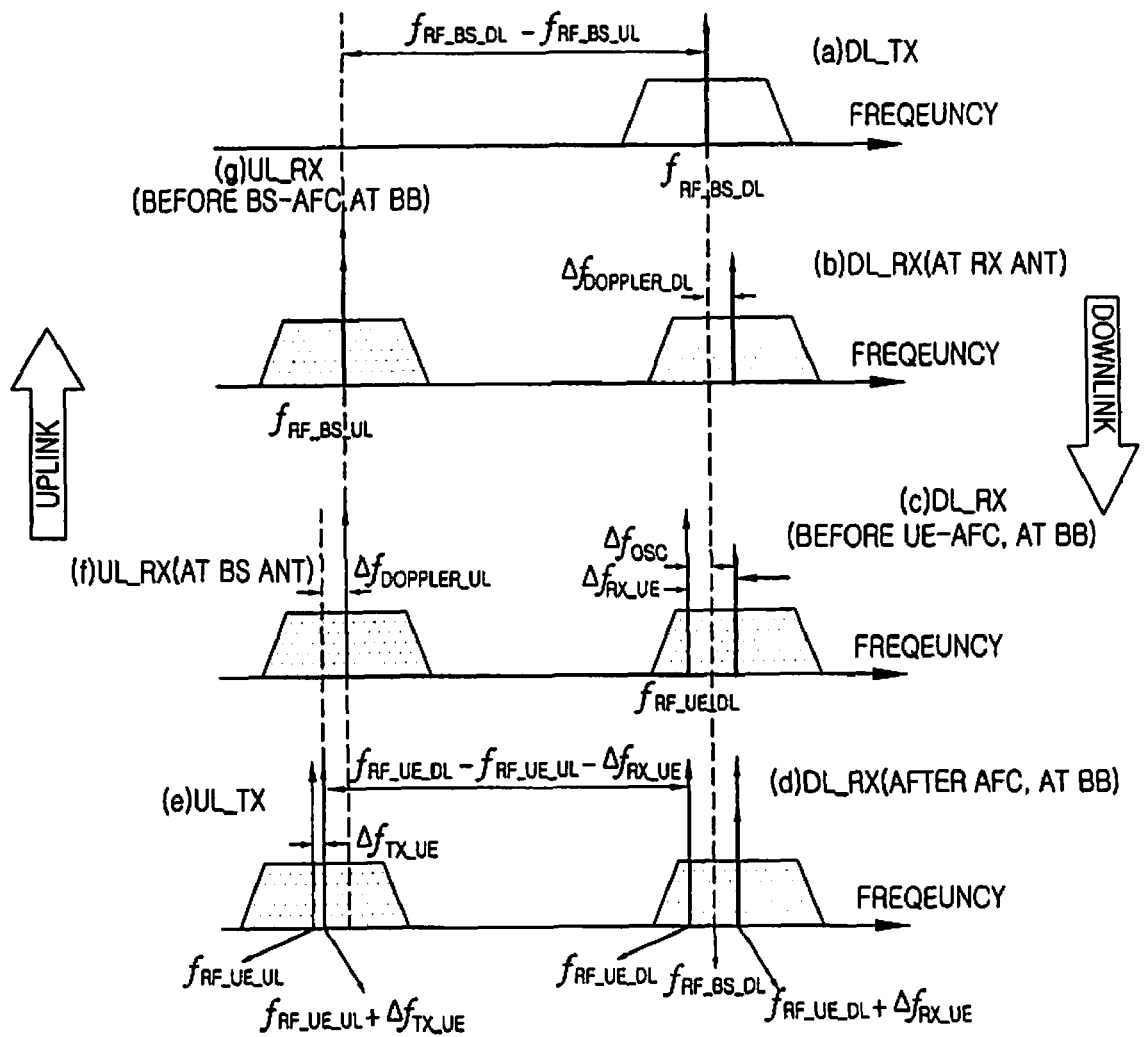
FIG. 9 is a flow diagram illustrating a frequency control method of the user equipment according to another embodiment of the present invention.

FIG. 9 depicts the frequency control method of the user equipment according to another embodiment of the present invention.

When the base station transmits a DL signal over the RF center frequency $f_{RF\_BS\_DL}$ in FIG. 9, the spectrum is generated as shown in (a). Since the Doppler frequency offset $\Delta f_{doppler\_DL}$ is generated, the user equipment acquires the receive spectrum as shown in (b). Because of the difference $\Delta f_{osc}$ between the receive frequency of the user equipment and the transmit frequency of the base station, the amount of the frequency offset actually generated at the user equipment is equal to $\Delta f_{doppler\_DL} + \Delta f_{osc}$ which combines the Doppler frequency offset and the transmit and receive frequency offset as shown in (c).

When the user equipment is moving around, the receiver NCO compensates for the frequency offset $f_{RF\_UE\_UL} + \Delta f_{RX\_UE}$ using the DL signal and the transmitter NCO transmits the compensated transmit signal as shown in (d). In other words, the user equipment controls the transmitter NCO to generate the signal corresponding to $f_{RF\_UE\_UL} + \Delta f_{TX\_UE}$ using the RF center frequency according to the UL signal transmission as shown (e).

Hence, the signal received at the base station suffers the Doppler frequency $\Delta f_{doppler\_UL}$ in (f). As a result, the RF frequency of the UL signal received at the base station matches the RF frequency used by the base station as shown in (g). That is, the UL reception is feasible with the Doppler frequency compensated according to the motion of the user equipment.

As set forth above, by promptly controlling the frequency of the UL signal of the user equipment according to the velocity, the ICI between the user equipments can be mitigated. Therefore, the UL cell capacity can be increased and the data rate can be raised.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile communication terminal for controlling a frequency, the terminal comprising:
   a frequency regulator for estimating a DownLink (DL) Doppler frequency offset using a DL receive signal when a velocity of the terminal is greater than a threshold, determining an UpLink (UL) Doppler frequency offset using the estimated DL Doppler frequency offset, determining a frequency offset compensation value using the UL Doppler frequency offset and the DL Doppler frequency offset, and compensating a center frequency of a UL receive signal using the frequency offset compensation value,
   wherein, when confirming that a transmit and receive frequency spacing of the terminal is less than a Radio Frequency (RF) frequency value, the frequency offset compensation value is twice the DL Doppler frequency offset.

2. The terminal of claim 1, wherein the frequency regulator determines the velocity of the mobile communication terminal using a Doppler frequency of the terminal.

3. The terminal of claim 1, wherein the UL Doppler frequency offset is determined based on a ratio of the center frequency of the UL receive signal to a center frequency of a DL and the DL Doppler frequency offset.

4. The terminal of claim 1, wherein the DL Doppler frequency offset comprises a difference between a frequency offset estimated from a DL of the terminal and a static frequency offset value.

5. The terminal of claim 1, wherein the frequency offset compensation value is calculated using the UL Doppler frequency offset, the DL Doppler frequency offset and a frequency offset for a Numerically Controlled Oscillator (NCO), when the terminal utilizes the NCO,
   wherein the frequency offset for the NCO is determined based on a ratio of the center frequency of a UL to a center frequency of a DL and a frequency offset estimated from the DL of the terminal.

6. The terminal of claim 1, wherein the frequency regulator calculates the frequency offset compensation value of the terminal which directly controls an oscillator based on:

$$\Delta f_{TX\_UE} = -\Delta f_{Doppler\_DL} - \Delta f_{Doppler\_UL}$$

$$= -\Delta f_{Doppler\_DL} - \frac{f_{RF\_UE\_UL}}{f_{RF\_UE\_DL}} \cdot \Delta f_{Doppler\_DL}$$

$$= -\left(1 + \frac{f_{RF\_UE\_UL}}{f_{RF\_UE\_DL}}\right) \cdot \Delta f_{Doppler\_DL}$$

$$= -\left(1 + \frac{f_{RF\_UE\_UL}}{f_{RF\_UE\_DL}}\right) \cdot (\Delta f_{RX\_UE} - \Delta f_{static})$$

where $\Delta f_{TX\_UE}$ denotes the frequency offset compensation value to compensate for a required frequency for a transmit frequency band, $\Delta f_{Doppler\_DL}$ denotes the DL Doppler frequency offset, $\Delta f_{Doppler\_UL}$ denotes the UL Doppler frequency offset, $\Delta f_{RX\_UE}$ denotes the frequency offset estimated from a DL of the terminal, $\Delta f_{static}$ denotes a static frequency offset value, $f_{RF\_UE\_UL}$ denotes a center frequency of a UL, and $f_{RF\_UE\_DL}$ denotes a center frequency of the DL.

7. The terminal of claim 1, wherein, the frequency regulator calculates the frequency offset compensation value based on:

$$\Delta f_{TX\_UE} \approx -2 \cdot \Delta f_{Doppler\_DL} \text{ when } f_{RF\_UE\_DL} \approx f_{RF\_UE\_UL}$$

$$= -2 \cdot (\Delta f_{RX\_UE} - \Delta f_{static})$$

where $\Delta f_{TX\_UE}$ denotes the frequency offset compensation value to compensate for the required frequency for the transmit frequency band, $\Delta f_{Doppler\_DL}$ denotes the DL Doppler frequency offset, $\Delta f_{static}$ denotes the static frequency offset value, and $\Delta f_{RX\_UE}$ denotes the frequency offset value estimated from the DL of the terminal.

8. The terminal of claim 1, wherein the frequency regulator calculates a frequency offset compensation value of the terminal which utilizes the NCO based on:

$$\Delta f_{TX\_UE} = \frac{f_{RF\_UE\_UL}}{f_{RF\_UE\_DL}} \cdot \Delta f_{RX\_UE} - \Delta f_{Doppler\_DL} - \Delta f_{Doppler\_UL}$$

$$= \frac{f_{RF\_UE\_UL}}{f_{RF\_UE\_DL}} \cdot \Delta f_{RX\_UE} - \Delta f_{Doppler\_DL} -$$

$$\frac{f_{RF\_UE\_UL}}{f_{RF\_UE\_DL}} \cdot \Delta f_{Doppler\_DL}$$

$$= \frac{f_{RF\_UE\_UL}}{f_{RF\_UE\_DL}} \cdot \Delta f_{RX\_UE} - \left(1 + \frac{f_{RF\_UE\_UL}}{f_{RF\_UE\_DL}}\right) \cdot \Delta f_{Doppler\_DL}$$

$$= \frac{f_{RF\_UE\_UL}}{f_{RF\_UE\_DL}} \cdot \Delta f_{RX\_UE} - \left(1 + \frac{f_{RF\_UE\_UL}}{f_{RF\_UE\_DL}}\right) \cdot (\Delta f_{RX\_UE} - \Delta f_{static})$$

where $\Delta f_{TX\_UE}$ denotes the frequency offset compensation value to compensate for a required frequency for a transmit frequency band, $\Delta f_{Doppler\_DL}$ denotes the DL Doppler frequency offset, $\Delta f_{Doppler\_UL}$ denotes the UL Doppler frequency offset, $\Delta f_{RX\_UE}$ denotes the frequency offset value estimated from the DL of the terminal, $\Delta f_{static}$ denotes a static frequency offset value, $f_{RF\_UE\_UL}$ denotes the center frequency of the UL, and $f_{RF\_UE\_DL}$ denotes a center frequency of the DL.

9. The terminal of claim 8, wherein, when confirming that a transmit and receive frequency spacing of the terminal is less than an RF frequency value, the frequency regulator calculates the frequency offset compensation value based on:

$$\Delta f_{TX\_UE} \approx \Delta f_{RX\_UE} - 2 \cdot \Delta f_{Doppler\_DL} \text{ when } f_{RF\_UE\_DL} \approx f_{RF\_UE\_UL}$$

$$= -\Delta f_{RX\_UE} + 2\Delta f_{static}$$

where $\Delta f_{TX\_UE}$ denotes the frequency offset compensation value to compensate for the required frequency for the transmit frequency band, $\Delta f_{Doppler\_DL}$ denotes the DL Doppler frequency offset, $\Delta f_{static}$ denotes the static frequency offset value, and $\Delta f_{RX\_UE}$ denotes the frequency offset value estimated from the DL of the terminal.

10. A method for controlling a frequency in a mobile communication terminal, the method comprising:
  estimating a DownLink (DL) Doppler frequency offset using a DL receive signal when a velocity of the mobile communication terminal is greater than a threshold;
  determining an UpLink (UL) Doppler frequency offset using the estimated DL Doppler frequency offset;
  determining a frequency offset compensation value using the UL Doppler frequency offset and the DL Doppler frequency offset; and
  compensating a center frequency of a UL receive signal using the frequency offset compensation value,
  wherein, when confirming that a transmit and receive frequency spacing of the mobile communication terminal is less than a Radio Frequency (RF) frequency value, the frequency offset compensation value is twice the DL Doppler frequency offset.

11. The method of claim 10, wherein a velocity of the mobile communication terminal is determined by using a Doppler frequency of the mobile communication terminal.

12. The method of claim 10, wherein the UL Doppler frequency offset is determined based on a ratio of the center frequency of the UL receive signal to a center frequency of a DL and the DL Doppler frequency offset.

13. The method of claim 10, wherein the DL Doppler frequency offset includes a difference between a frequency offset estimated from a DL of the mobile communication terminal and a static frequency offset value.

14. The method of claim 10, wherein the frequency offset compensation value is calculated using the UL Doppler frequency offset, the DL Doppler frequency offset and a frequency offset for a Numerically Controlled Oscillator (NCO), when the mobile communication terminal utilizes the NCO,
  wherein the frequency offset for the NCO is determined based on a ratio of the center frequency of the UL to a center frequency of a DL and a frequency offset estimated from the DL of the mobile communication terminal.

15. The method of claim 10, wherein the frequency offset compensation value is calculated using direct control of an oscillator based on:

$$\Delta f_{TX\_UE} = -\Delta f_{Doppler\_DL} - \Delta f_{Doppler\_UL}$$

$$= -\Delta f_{Doppler\_DL} - \frac{f_{RF\_UE\_UL}}{f_{RF\_UE\_DL}} \cdot \Delta f_{Doppler\_DL}$$

$$= -\left(1 + \frac{f_{RF\_UE\_UL}}{f_{RF\_UE\_DL}}\right) \cdot \Delta f_{Doppler\_DL}$$

$$= -\left(1 + \frac{f_{RF\_UE\_UL}}{f_{RF\_UE\_DL}}\right) \cdot (\Delta f_{RX\_UE} - \Delta f_{static})$$

where $\Delta f_{TX\_UE}$ denotes the frequency offset compensation value to compensate for a required frequency for a transmit frequency band, $\Delta f_{Doppler\_DL}$ denotes the DL Doppler frequency offset, $\Delta f_{Doppler\_UL}$ denotes the UL Doppler frequency offset, $\Delta f_{RX\_UE}$ denotes the frequency offset estimated from the DL of the mobile communication terminal, $\Delta f_{static}$ denotes a static frequency offset value, $f_{RF\_UE\_UL}$ denotes the center frequency of the UL, and $f_{RF\_UE\_DL}$ denotes a center frequency of the DL.

16. The method of claim 10, wherein, the frequency offset compensation value is calculated based on:

$$\Delta f_{TX\_UE} \approx -2 \cdot \Delta f_{Doppler\_DL} \text{ when } f_{RF\_UE\_DL} \approx f_{RF\_UE\_UL}$$

$$= -2 \cdot (\Delta f_{RX\_UE} - \Delta f_{static})$$

where $\Delta f_{TX\_UE}$ denotes the frequency offset compensation value to compensate for the required frequency for the transmit frequency band, $\Delta f_{Doppler\_DL}$ denotes the DL Doppler frequency offset, $\Delta f_{static}$ denotes the static frequency offset value, and $\Delta f_{RX\_UE}$ denotes the frequency offset value estimated from the DL of the mobile communication terminal.

17. The method of claim 10, wherein the frequency offset compensation value is calculated utilizing a Numerically Controlled Oscillator (NCO) based on:

$$\Delta f_{TX\_UE} = \frac{f_{RF\_UE\_UL}}{f_{RF\_UE\_DL}} \cdot \Delta f_{RX\_UE} - \Delta f_{Doppler\_DL} - \Delta f_{Doppler\_UL}$$

$$= \frac{f_{RF\_UE\_UL}}{f_{RF\_UE\_DL}} \cdot \Delta f_{RX\_UE} - \Delta f_{Doppler\_DL} -$$

$$\frac{f_{RF\_UE\_UL}}{f_{RF\_UE\_DL}} \cdot \Delta f_{Doppler\_DL}$$

$$= \frac{f_{RF\_UE\_UL}}{f_{RF\_UE\_DL}} \cdot \Delta f_{RX\_UE} - \left(1 + \frac{f_{RF\_UE\_UL}}{f_{RF\_UE\_DL}}\right) \cdot \Delta f_{Doppler\_DL}$$

$$= \frac{f_{RF\_UE\_UL}}{f_{RF\_UE\_DL}} \cdot \Delta f_{RX\_UE} - \left(1 + \frac{f_{RF\_UE\_UL}}{f_{RF\_UE\_DL}}\right) \cdot (\Delta f_{RX\_UE} - \Delta f_{static})$$

where $\Delta f_{TX\_UE}$ denotes the frequency offset compensation value to compensate for a required frequency for a transmit frequency band, $\Delta f_{Doppler\_DL}$ denotes the DL Doppler frequency offset, $\Delta f_{Doppler\_UL}$ denotes the UL Doppler frequency offset, $\Delta f_{RX\_UE}$ denotes the frequency offset value estimated from a DL of the mobile communication terminal, $\Delta f_{static}$ denotes a static frequency offset value, $f_{RF\_UE\_UL}$ denotes the center frequency of the UL, and $f_{RF\_UE\_DL}$ denotes a center frequency of the DL.

18. The method of claim 17, wherein, when confirming that a transmit and receive frequency spacing of the mobile communication terminal is less than an RF frequency value, the frequency offset compensation value is calculated based on:

$$\Delta f_{TX\_UE} \approx \Delta f_{RX\_UE} - 2 \cdot \Delta f_{Doppler\_DL} \text{ when } f_{RF\_UE\_DL} \approx f_{RF\_UE\_UL}$$

$$= -\Delta f_{RX\_UE} + 2\Delta f_{static}$$

where $\Delta f_{TX\_UE}$ denotes the frequency offset compensation value to compensate for the required frequency for the transmit frequency band, $\Delta f_{Doppler\_DL}$ denotes the DL Doppler frequency offset, $\Delta f_{static}$ denotes the static frequency offset value, and $\Delta f_{RX\_UE}$ denotes the frequency offset value estimated from the DL of the mobile communication terminal.

* * * * *